G. C. BREIDERT.
CAR VENTILATOR.
APPLICATION FILED MAY 12, 1913.

1,099,838.

Patented June 9, 1914.

5 SHEETS—SHEET 1.

WITNESSES:
H. M. Gillespie
J. B. Lagoriv

INVENTOR.
George C. Breidert
BY Barnett & Truman
ATTORNEYS

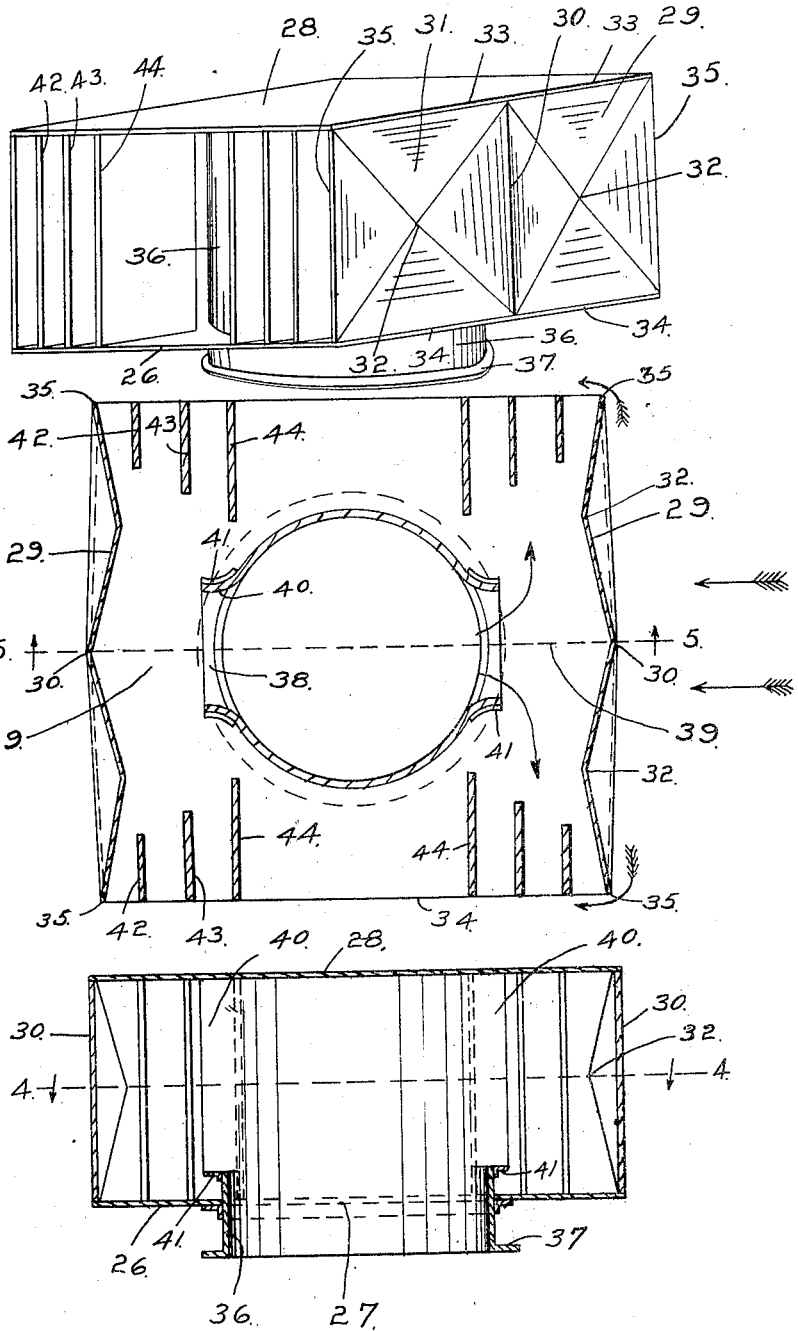

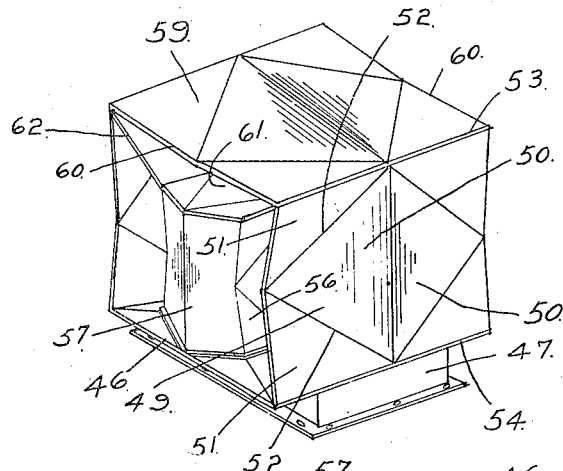
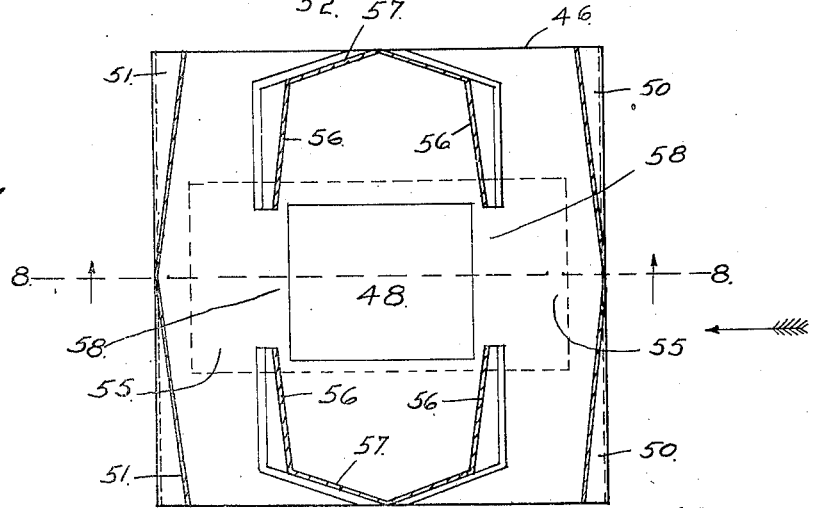
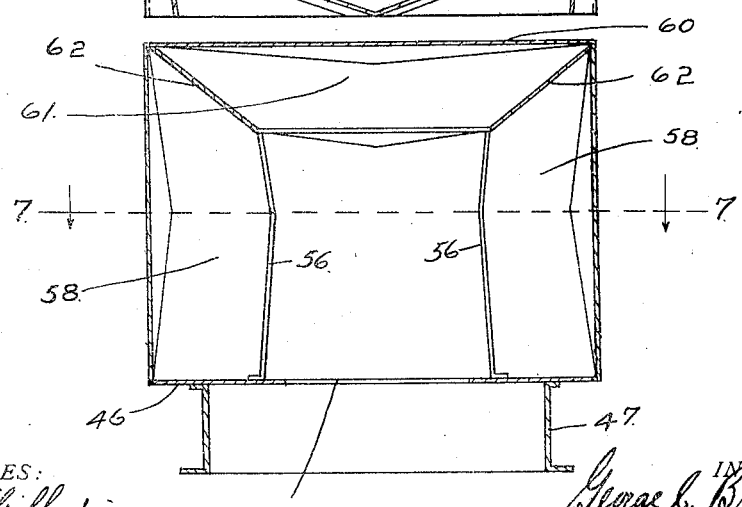

G. C. BREIDERT.
CAR VENTILATOR.
APPLICATION FILED MAY 12, 1913.

1,099,838.

Patented June 9, 1914.
5 SHEETS—SHEET 5.

WITNESSES:
H. M. Gillespie
J. B. Lagorio

INVENTOR.
George C. Breidert
BY Barnett & Truman
ATTORNEYS

UNITED STATES PATENT OFFICE.

GEORGE C. BREIDERT, OF CHICAGO, ILLINOIS, ASSIGNOR TO AUTO UTILITIES MANUFACTURING COMPANY, OF CHICAGO, ILLINOIS, A CORPORATION OF ILLINOIS.

CAR-VENTILATOR.

1,099,338.   Specification of Letters Patent.   Patented June 9, 1914.

Application filed May 12, 1913. Serial No. 767,088.

*To all whom it may concern:*

Be it known that I, GEORGE C. BREIDERT, a citizen of the United States, residing at Chicago, in the county of Cook and State of Illinois, have invented certain new and useful Improvements in Car-Ventilators, of which the following is a specification.

My invention relates to ventilators, and particularly to ventilators for cars, or other moving structures, which are provided with air-ramming faces arranged transversely to the line of travel of the car and with exhaust openings terminating at the edges of said air-ramming faces over which the air displaced by said ventilator is caused to pass so as to create a vacuum which withdraws the foul air from the interior of the car.

One of the primary objects of this invention is to provide certain improved arrangements relating to the construction and configuration of the air-ramming faces whereby the air displaced is directed in a larger volume over the exhaust openings and less of it allowed to escape over the other edges of said faces than in the devices of this general character heretofore used.

A further object is to provide certain novel dispositions of the partitions and deflector plates constituting the internal arrangement of the ventilator for the purpose of more surely preventing back drafts and hindering dust, cinders, rain, and the like, from entering the car through the ventilator and for the additional purpose of enabling a side wind to operate to effect the ventilation of the car when the latter is at a standstill; the particular object which these constructions and devices have being to provide a valveless ventilator with exhaust passages through which the foul air from the car will pass with a maximum degree of velocity, the operation of which will not be affected by the direction of the wind.

The invention consists in the several novel and improved devices, constructions and arrangement in ventilators of this type herein shown, described and claimed for carrying out the above purposes and such other objects as will appear from the following description of the several typical embodiments of the invention which have been selected for purposes of illustrating the principles of the invention.

Figure 1:
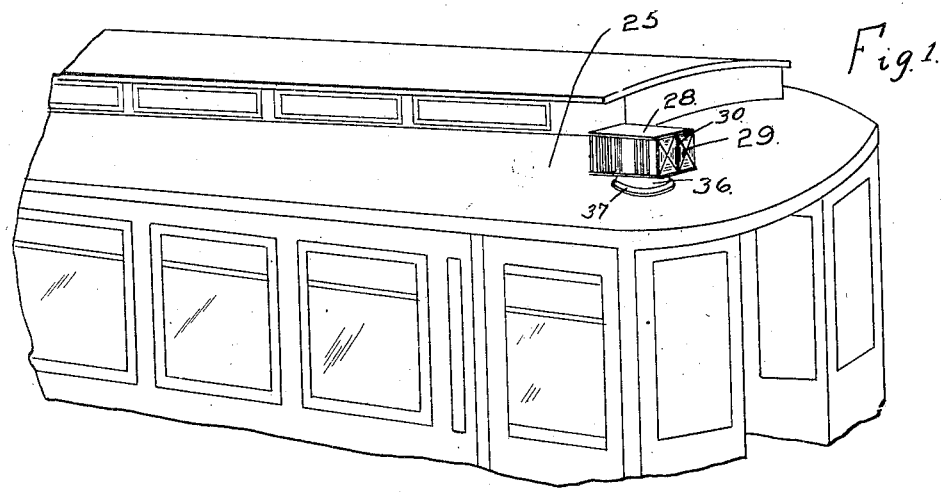
Figure 2:
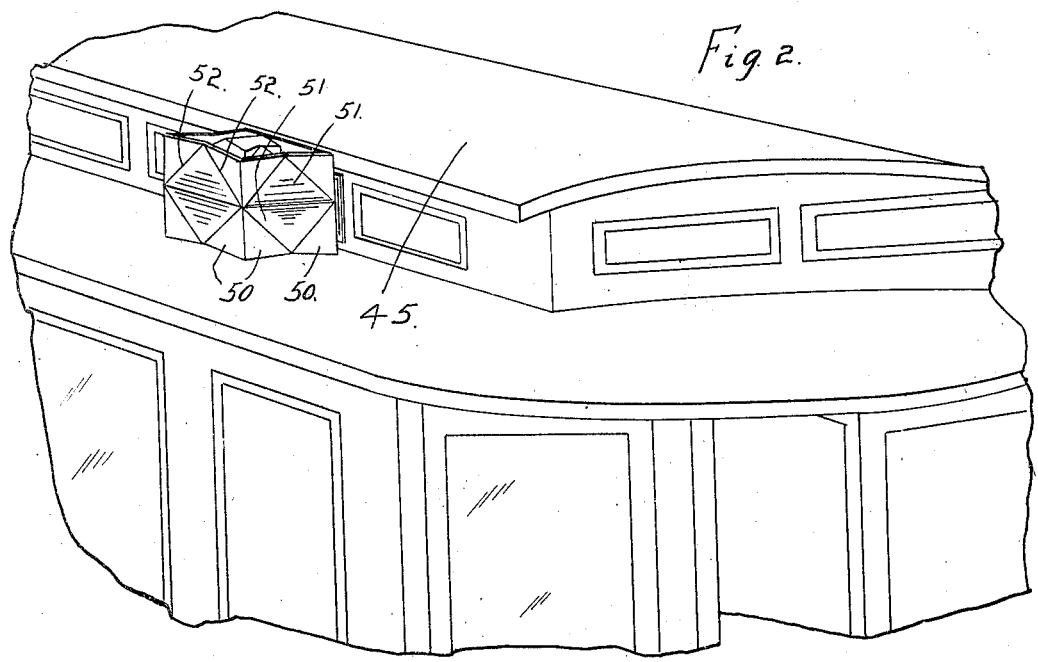
Figure 9:
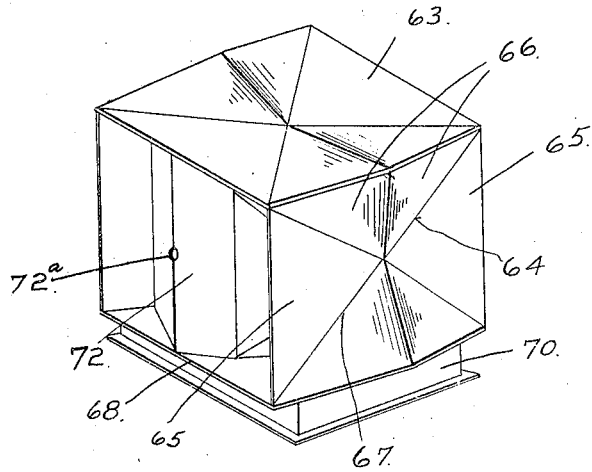
Figure 10:
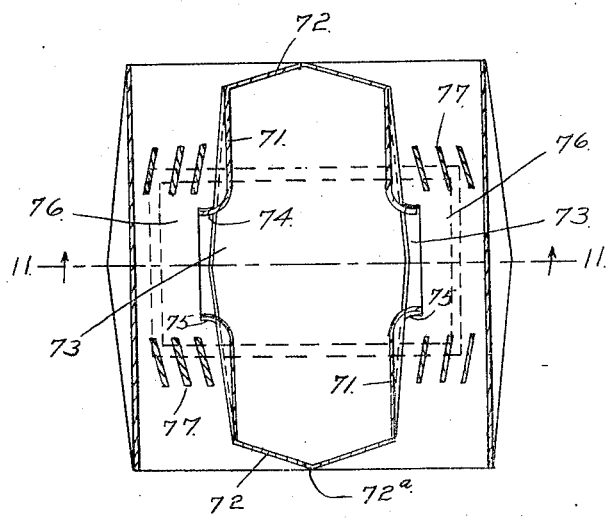
Figure 11:
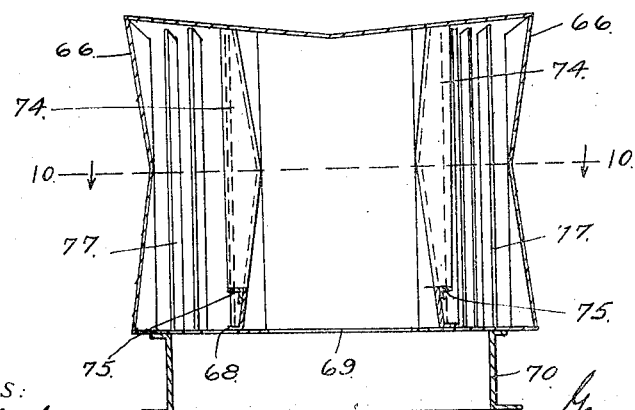

Referring to the drawings, Figure 1 is a fragmentary view, in perspective, of a car showing a ventilator embodying one form of my invention; Fig. 2, a similar view showing a different form of ventilator; Fig. 3, a view, in perspective, on an enlarged scale, of the ventilator shown in Fig. 1; Fig. 4, a sectional plan of the ventilator, this view being taken on line 4—4 of Fig. 5; Fig. 5, a sectional view taken on line 5—5 of Fig. 4; Fig. 6, a view, in perspective, of a ventilator shown in Fig. 2; Fig. 7, a sectional plan of the ventilator, the view being taken on line 7—7 of Fig. 8; Fig. 8, a sectional view on line 8—8 of Fig. 7; Fig. 9, a view, in perspective, of another modified construction; Fig. 10, a sectional plan of the same, taken on line 10—10 of Fig. 11; Fig. 11, a sectional view on line 11—11 of Fig. 10, and Figs. 12 and 13, views, in perspective, of two other ventilators showing modifications in the construction and configuration of the air-ramming faces.

Like characters of reference designate like parts in the several figures of the drawings.

In Fig. 1 I have shown a ventilator, the details of construction of which are illustrated in Figs. 3 to 5 inclusive, which is mounted on the deck of a car designated 25, the ventilator communicating with the interior of the car through an opening in the roof. The ventilator consists of a box like structure made up of a base 26 having a circular opening 27 therein, an imperforate outer end or top 28, and two oppositely arranged air-ramming faces 29 which are arranged transversely with respect to the direction of travel of the car, these faces acting alternately in accordance with the direction in which the car is moving. Each air-ramming face is preferably pressed or bent or otherwise formed so as to provide a central V-shaped portion 30 and on each side of this triangular surfaces 31 which are inclined toward the interior of the ventilator from their outer margins to their apexes which coincide at the points 32. The purpose of this arrangement is to deter the air displaced by the ventilator from escaping over the upper and lower edges 33, 34 of the air-ramming face and to cause the displaced air to pass instead in as large a measure as possible over the lateral edges 35, the configuration being preferably such that the edges 35 do not project outwardly quite as far as the V-shaped portion 30 of the face.

The box like structure above described is mounted on a cylindrical element 36 preferably provided with a flange 37 for attachment to the deck of the car, and this cylindrical element extends up to the top or end wall 28 and is cut away opposite the air-ramming faces to provide exhaust openings 38 which discharge into the spaces or passageways 39 within said faces. The cylindrical element is bent out on each side of these openings to form deflecting lips 40. The openings 38 do not extend down to the base 26 so that water, dust, or the like, which may be blown into the passageways 39 is kept from entering the car through the opening 27. Preferably rims or flanges 41 are provided at the lower edges of the openings 38. Arranged in the open sides of the ventilator are louvers or deflecting elements 42, 43, 44 which increase in width toward the center of the car. The purpose of these louvers is to prevent a diagonal wind from blowing into the car through the openings 38.

I do not lay claim herein to the particular internal arrangements just described, this application claiming specifically the arrangements for the interior of the ventilator which will be hereinafter described.

In Figs. 2 and 6 to 8 inclusive I have shown a different internal arrangement of deflectors and partitions, a different configuration for the air-ramming faces, and also an arrangement by which a side wind may be utilized for assisting the air displaced by the movement of the car in producing the exhaust. The device, in this case, is shown as operating through one of the deck windows of the car, designated 45 in Fig. 2. Secured to the base 46 is a neck 47 which may be secured to the clerestory of a car over one of its deck windows. The base has an opening 48. The air-ramming faces 49 are pressed or bent so as to provide V-shaped portions 50 and triangular surfaces 51 which are inclined toward the interior of the ventilator from their outer corners to the lines of juncture 52 with the V-shaped portion. This configuration, it will be seen, checks the tendency of the air displaced by the ventilator from slipping over the edges 53, 54 and so being wasted. The exhaust passages 55 which extend through the ventilator inwardly of the air-ramming faces are defined by angular elements, the interior portions of which, 56, are parallel to the oppositely disposed portions of the air-ramming faces, so that the cross sectional area of the discharge passage is kept substantially uniform except at the middle, the exterior portions, 57, of said elements being preferably wedge or V-shaped. There are two of these elements, one at each side of the ventilator, and they are spaced apart so as to provide exhaust openings 58 through which the air from the car is discharged into the passages 55. By giving the V-shaped configuration to the portion of the structure designated 57 the egress of the air from the car is facilitated and if there be a side wind it is deflected into the passageways 55, and while diminishing the vacuum produced by the motion of the car on the side of the ventilator at which it enters, tends to increase the force of the exhaust at the opposite side of the ventilator. If the car is stationary and there happens to be a side wind, this wind operating against a V-shaped side member, will produce an exhaust through the ventilator, although not as strong as that provided by the air-ramming face when the car is in motion. The outer end, 59, has preferably the same configuration as the air-ramming faces so that if there be a strong side wind blowing against this surface it is directed over the edges 60 of this face. The elements 56, 57, do not extend out to the end face 59 which leaves a space or passageway 61 extending through the ventilator along the inside of the end face 59 which communicates with the interior of the car. The passage of air over the edges 60 produces a suction which helps to withdraw foul air from the car. The exhaust passage 61 is separated from the exhaust passages 58 by partitions 62.

In Figs. 9 to 11 inclusive the outer end 63 and the air-ramming faces 64 have preferably similar configurations as in the construction last described. Each of these faces is bent or pressed so as to provide triangular surfaces 65 which lie in the same plane with each other and on either side of the triangular surfaces 65 a pair of triangular surfaces 66 which are inclined outwardly from their lines of juncture 67 with the surfaces 65. The ventilator is provided with the usual base 68 having a central opening 69. If need be the ventilator is mounted on a neck 70. In the open sides of the ventilator are angular structures, the interior portions 71 of which are given the same general configuration as the air-ramming faces, the exterior portions 72 being preferably wedge shaped as shown. These elements are spaced apart to provide exhaust openings 73 and are formed with deflecting lips 74. The openings 73 do not extend to the base, the lower edges being preferably protected with the flanges 75. Within the exhaust passages 76 are arranged the obliquely disposed louvers 77. These louvers prevent an oblique wind from blowing into the ventilator through openings 73 and also direct any wind that may blow through the passages 76 outwardly away from the opening 73 so that such wind does not have a tendency to choke the openings 73 as might otherwise be the case. I do not claim herein the arrangement of the louvers in the exhaust passageways of the ventilator, as this arrangement is claimed in my co-pending application, Serial No. 763,047, filed April 23, 1913.

It will be understood that any of the ventilators shown herein might be used either in the position shown in Fig. 1 or that shown in Fig. 2. If the ventilator just described is placed in the same position as the ventilator shown in Fig. 2, and if the air in the car contains a great deal of moisture, there is a chance that condensation will collect in the space within the lower one of the elements 71, 72. To prevent this the V-shaped portion 72 is formed with an aperture 72ª. This device for freeing the ventilator from condensed moisture might be used in connection with the other types of ventilator shown herein.

Figure 12:
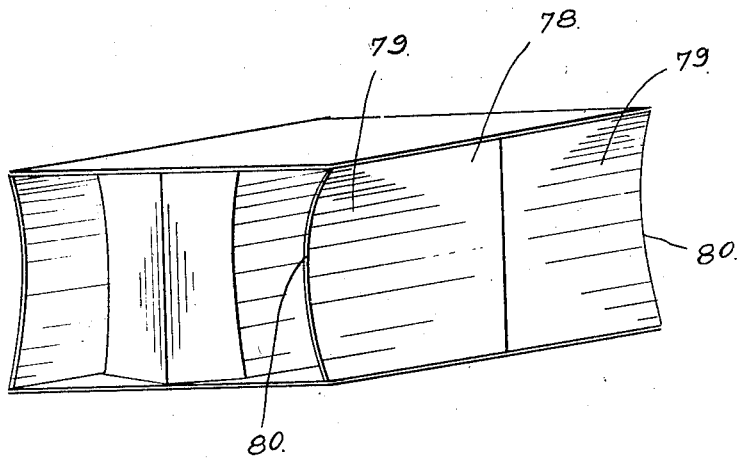

Fig. 12 shows a modified configuration for the air-ramming face. The face, in this instance, is formed with the central angular projection 78 which merges into concavities or depressions 79 on each side, these depressions serving to direct the displaced air over the edges 80 of the face. The face, in its general contour, is much the same as those shown in Fig. 2 and Figs. 6 and 8 inclusive, except that the surfaces are curved instead of being flat. Any suitable internal arrangement for the ventilator may be provided.

Figure 13:
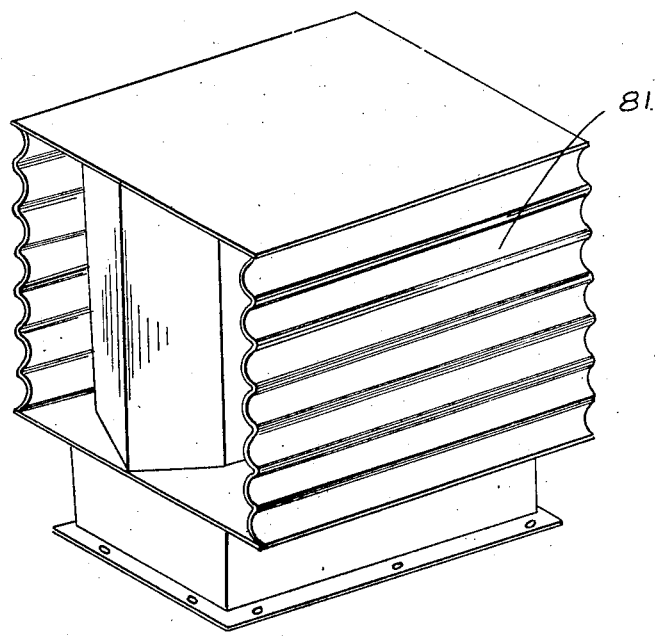

In Fig. 13 the air-ramming faces 81 are fluted, the flutings terminating at the edges over which the air is sought to be directed.

While I have described my invention in several preferred embodiments, it will be realized that further modifications might be made without departing from the principles of the invention.

I claim:

1. A ventilator for cars, or the like consisting of a hollow box-like structure open at opposite sides and comprising a base having an opening therein communicating with the interior of the car, oppositely disposed air-ramming faces and an end face, and means for providing separate exhaust passages extending through the ventilator from side to side along each of said air-ramming faces and along said end face which are in communication with the interior of the car through the opening in said base.

2. A ventilator for cars, or the like provided with an air-ramming face and formed with an exhaust passageway terminating at opposite edges of said air-ramming face, said face being formed so as to have a central V-shaped portion consisting of two triangular surfaces, and on each side thereof a pair of triangular surfaces which are inclined toward the interior of the ventilator from their outer corners to the lines of juncture with said V-shaped portion.

3. A ventilator for cars, and the like, provided with an air ramming face and formed with an exhaust passage way terminating at opposite edges of said face, said face being formed with a central wedge-shaped portion and at each corner thereof with a surface inclined inwardly of the ventilator from the corner thereof toward the central projecting portion.

4. A ventilator for cars, and the like, comprising a box like structure having a base formed with an opening communicating with the car, an oppositely disposed, imperforate end, and air ramming faces oppositely disposed with respect to each other, and two relatively opposite open sides, and elements arranged in said open sides of said structure, the extremities of which are V-shaped and which do not project outwardly beyond the edges of said air ramming faces.

5. A ventilator for cars or the like, comprising a hollow structure, formed with an opening communicating with the interior of the car, and provided with an air-ramming face disposed transversely to the line of travel of the car, and with an exhaust passageway communicating with said opening and terminating in exhaust openings at opposite edges of said air-ramming face; said face being depressed to provide projections along the edges of the face between said exhaust openings which check the escape of air over said last named edges.

6. A ventilator for cars or the like, comprising a hollow structure formed with an opening communicating with the interior of the car, and provided with an air-ramming face disposed transversely to the line of travel of the car, and with an exhaust passageway communicating with said opening and terminating in exhaust openings at opposite edges of said air-ramming face; said face being depressed to provide a central wedge-shaped projection adapted to deflect air toward said exhaust openings and projections along the edges of the face between said exhaust openings which check the escape of air over said last named edges.

7. A ventilator for cars or the like, comprising a hollow structure formed with an opening communicating with the interior of the car, and provided with an air-ramming face disposed transversely to the line of travel of the car, and with an exhaust passageway communicating with said opening and terminating in exhaust openings at opposite edges of said air-ramming face; said face being depressed on diagonal lines to provide a central wedge-shaped projection adapted to deflect air toward said exhaust openings and projections along the edges of the face between said exhaust openings which check the escape of air over said last named edges.

8. A ventilator for cars or the like, comprising a hollow structure formed with an opening communicating with the interior of the car, and provided with an air-ramming face disposed transversely to the line of travel of the car, and with an exhaust passageway communicating with said opening and terminating in an exhaust opening at one edge of said air-ramming face; said edge being bent inwardly of the ventilator at the center so as to direct the air impinging on said face toward said exhaust opening.

9. A ventilator for cars or the like, comprising a hollow structure formed with an opening communicating with the interior of the car, and provided with an air-ramming face disposed transversely to the line of travel of the car, and with an exhaust passageway communicating with said opening and terminating in an exhaust opening at one edge of said air-ramming face; said face being depressed so as to provide a surface which slants inwardly of the ventilator and toward said exhaust opening and projections along the edges of the face which terminate at said opening and are adapted to check the escape of air over said last named edges.

10. A ventilator for cars or the like, comprising a hollow structure formed with an opening communicating with the interior of the car, and provided with three faces, two of which are substantially parallel and the other arranged between said parallel faces, and with separate exhaust passageways extending through said ventilator along said faces respectively and communicating with said opening.

GEORGE C. BREIDERT.

Witnesses:
   H. M. GILLESPIE,
   L. A. FALKENBERG.